United States Patent [19]

Scungio

[11] Patent Number: 4,821,543

[45] Date of Patent: Apr. 18, 1989

[54] DOUBLE ENDED KEY RING

[75] Inventor: Robert Scungio, W. Warwich, R.I.

[73] Assignee: G. Pruefer Mfg. Co., Johnston, R.I.

[21] Appl. No.: 208,470

[22] Filed: Jun. 20, 1988

[51] Int. Cl.[4] .................................... A44B 15/00
[52] U.S. Cl. ............................ 70/456 R; 24/3 K;
    24/239; 24/371; 206/37.1; 206/37.8; D3/61
[58] Field of Search ............... 70/456 R, 456 B, 459;
    24/3 K, 371, 373, 239, 241 R, 241 S, 234;
    D3/61, 62; 206/37.1, 37.3, 37.5, 37.8

[56] References Cited

U.S. PATENT DOCUMENTS

| | | | |
|---|---|---|---|
| 370,918 | 10/1887 | Armstrong | 24/239 |
| 828,823 | 8/1906 | Maize | 24/239 |
| 974,950 | 11/1910 | Carter | 24/239 |
| 995,260 | 6/1911 | Korf et al. | 24/239 |
| 1,357,669 | 11/1920 | Anderson et al. | 24/371 X |
| 1,375,090 | 4/1921 | Grode | 24/239 |
| 1,460,998 | 7/1923 | Zangrilli | 24/371 X |
| 1,644,562 | 10/1927 | Browning | 24/239 |
| 2,916,907 | 12/1959 | Bridwell | 24/239 |
| 3,597,951 | 8/1971 | Nadel | 70/459 |

FOREIGN PATENT DOCUMENTS

| | | | |
|---|---|---|---|
| 51262 | 2/1936 | Denmark | 24/239 |
| 448050 | 11/1912 | France | 24/239 |
| 654960 | 12/1928 | France | 24/239 |
| 201369 | 4/1939 | Switzerland | 24/371 |

Primary Examiner—Lloyd A. Gall
Attorney, Agent, or Firm—McAulay, Fields, Fisher, Goldstein & Nissen

[57] ABSTRACT

The present invention provides a double ended key ring that includes a pair of key holders for retaining a set of keys. The key holders are movably connected to a central housing and are biased to retract into a pair of seats located at the ends of the housing to prevent the removal of the keys from the key holders. When the key holders are pulled away from the housing, the keys may then be removed from the key holders.

The biasing mechanism for the key holders is located entirely within the housing. To this end the housing includes a central passageway that has a narrow bore, at one end, to preferably slidably receive a spring loaded lock pin that projects through the bore and is connected to one of the key holders. In order to permit the spring loaded lock pin and key holder to be assembled, the other end of the bore remains open until closed by a bushing. The bushing includes a tubular sidewall and an endwall having another narrow bore. Another spring loaded lock pin is slidably extended through the bore of the endwall and is connected to the other of key holders, preferably as a subassembly. The bushing is then connected within the other end of the passageway by a force fit.

10 Claims, 2 Drawing Sheets

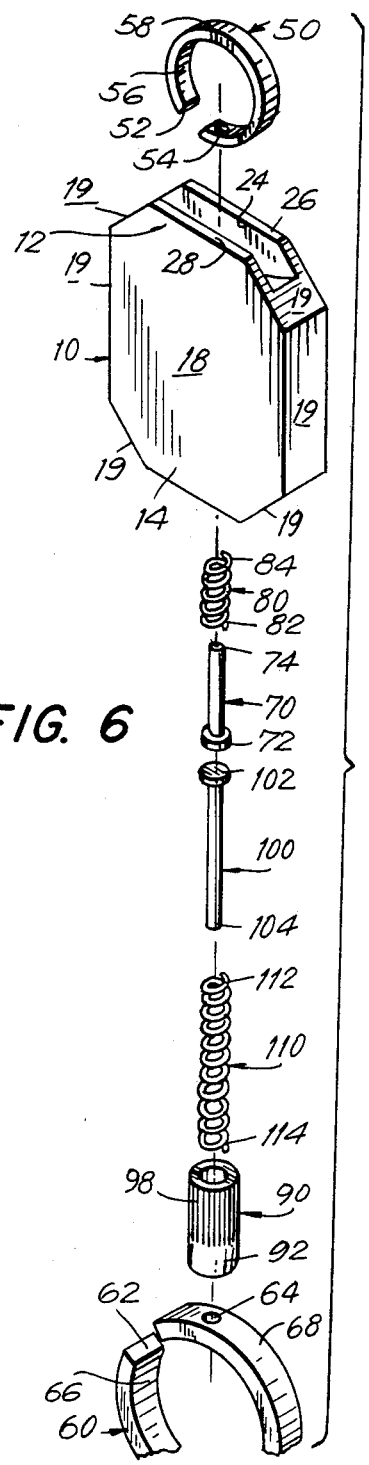
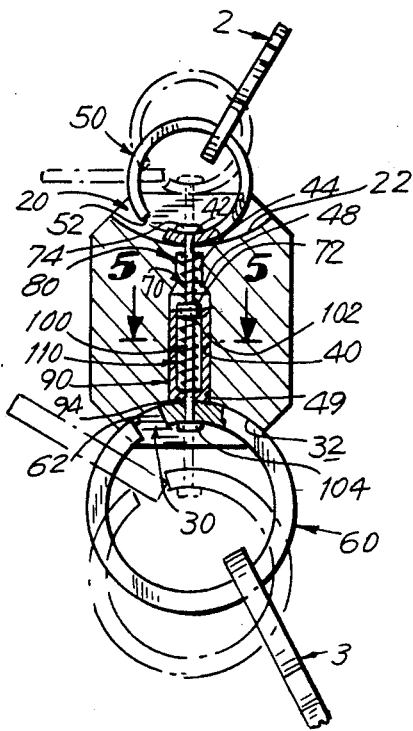
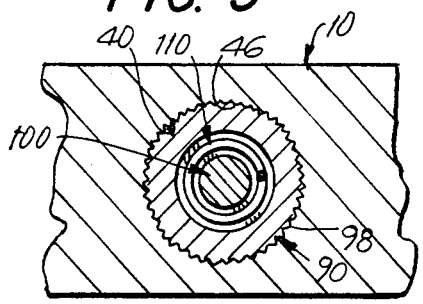

DOUBLE ENDED KEY RING

FIELD OF THE INVENTION

The present invention relates to key rings for retaining one or more keys on a key holder to prevent the loss of the keys. Even more particularly, the present invention relates to a double ended key ring having a pair of opposed, spaced key holders that are moveably connected to a central housing and are biased to retract into a pair of seats located at the opposite ends of the housing to prevent the removal of the keys from the key holders when retracted.

BACKGROUND OF THE INVENTION

The prior art has provided many designs for key rings that retain one or more keys on a key holder that is connected to a housing. An example of a prior art key ring is disclosed in Nadel, U.S. Pat. No. 3,597,951. *Nadel* utilizes a hook-like element having an external gapped, ring portion and an internal elongated shank portion that extends into a housing and also, into the coils of a spring located within the housing. The ring portion, which forms the key holder, is configured to pass through the retaining holes of the keys. The spring biases the ring portion to retract into an inverted, saddle-like seat that is located at one end of the housing. The base of the saddle, which has an opening for the passage of the shank portion, acts as an abutment, to limit the inward travel of the ring portion. The sidewalls of the saddle enclose a gap, that is defined in the ring portion, to prevent the keys from being removed through the gap when the ring portion is retracted within the seat. When the ring portion is pulled away from the housing, the gap is exposed to permit the keys to be removed from and to be mounted on the ring portion.

Other key rings of the prior art are double ended, that is, they employ a pair of key holders that are located at the opposite ends of a central housing. The advantages of such key rings over a key ring having a single key holder are manifest. For instance, the key carrying capacity of the key ring is increased by providing a pair of key holders. Additionally, keys may be segregated, yet retained on a single device. For example, automobile keys may be mounted on one of the key holders and house keys may be mounted on the other of the key holders to reduce the amount of fumbling that one normally goes through when trying to locate the desired key. Furthermore, such double ended key rings permit a key to be mounted on one of the key holders and an identifying tag for the key to be mounted on the other of the key holders.

A typical example of a prior art double ended key ring is Bridwell, U.S. Pat. No. 2,916,907. *Bridwell* employs a pair of gapped, loop-like members, that form the key holders. The loop-like members are located at the opposite ends of a tube, that forms a central housing, and are connected to one another and are biased against the ends of the tube by a spring located within the tube. In *Bridwell*, the annular end surfaces of the tube, form seats for the loop-like members that provide an abutment to limit the degree of inward travel of loop-like members. The transverse cross-section of the tube, and hence, the annular end surfaces, is sized so that when the loop-like members bear against the end surfaces, the gaps in the loop-like members are enclosed within the tube to prevent the removal of the keys from the loop-like members.

*Bridwell* is simply and inexpensively assembled by inserting the biasing spring into the tube, stretching the biasing spring past the ends of the tube, and then, connecting the key holders to the spring. The problem with the key ring design of *Bridwell* is that when one sights into the tube, the biasing spring is visible. The visibility of the biasing spring from the exterior of the housing can be aesthetically undesirable.

When the biasing mechanism is sought to be hidden within the housing, the key ring must employ an elongated portion or rod-like member, such as disclosed in *Nadel*, that slideably projects into a narrow opening of the housing and then into the coils of a biasing spring that is located within the housing. However, if the teachings of *Nadel* are applied to the double ended key ring of Bridwell, the result is a passageway, located within a housing, having narrow openings at its opposite ends that are too small to permit the entry of a biasing spring, let alone to permit the connection of the rod-like members to the biasing spring. This problem of design and assembly is solved in Zangrilli, U.S. Pat. No. 1,460,998. *Zangrilli,* discloses a pair of biasing mechanisms that are completely enclosed within the passageway of a tube-like housing. In order to solve the problem of assembling the biasing mechanisms within the passageway of the tube, a pair of spring loaded rods (forming the biasing mechanism) are inserted through openings located in a pair of endwalls. The endwalls are then brazed or welded to the ends of the tube. It should be pointed out that *Zangrilli* does not disclose that its biasing mechanism could be used in a key ring design. In this regard, the brazed or welded endwall construction of *Zangrilli* is not desirable for key rings because such fabrication would increase the unit cost of the key ring to an unacceptable level.

The present invention provides a double ended key ring in which a pair of key holders are located at the ends of a central housing. The central housing has a pair of seats for the key holders located at its ends. In a preferred embodiment, the seats comprise a pair of grooves and a pair of arcuate abutment surfaces that form the bottom of the grooves. A central passageway communicates between the abutment surfaces, and includes, a shoulder having a inner facing surface and a primary bore communicating between the inner facing surface and one of the abutment surfaces. In order to facilitate the assembly of the key ring, a cartridge-like bushing is provided that is operable to be located within the other end of the passageway. The bushing includes an endwall having a narrow opening. In a preferred embodiment, a pair of first and second lock pins respectively project, at one end, from the primary bore and the opening of the bushing, and are connected to the key holders. The lock pins respectively engage a pair of first and second biasing springs that respectively bear against the inner facing surface and the endwall of the bushing.

The use of the bushing solves the problem of inexpensively and simply assembling a double ended key ring by allowing one end of the passageway to remain open during assembly. In a preferred embodiment, one of the key holders and its associated first lock pin and first biasing spring are assembled in the end of the passageway having the primary bore and then, the bushing, the other key holder and its associated second lock pin and second biasing spring are assembled, as a subassembly, that is in turn inserted into the other end of the passageway. The bushing and the passageway may be sized for a force fitting connection to do away with the need for the prohibitively expensive welded or brazed construction that is provided for in *Zangrilli*.

In addition to the inexpensive and relatively simple assembly techniques, the present invention by preferably employing a pair of biasing springs, provides independent biasing forces to the key holders that can be preselected in accordance with the key carrying capacity of the key holders. Thus, one key holder can be made larger than the other key holder to carry more keys and its associated biasing spring can be designed to provide a greater biasing force than the other of the biasing springs. In this regard, the single biasing spring of *Bridwell*, necessarily, only provides a single biasing force to the loop-like members and as a result, the loop-like members are equally sized to have an equal key carrying capacity.

SUMMARY OF THE INVENTION

The present invention provides a double ended key ring that employs a pair of opposed, spaced key holders that are movably connected to the ends of a central housing. The housing has a central passageway that encloses biasing means for the key holders. The connection of the key holders to the biasing means is accomplished by the provision of connection means that slidably project from a primary bore located at one end of the passageway and as discussed previously, an opening located within a cartridge-like bushing. Bushing attachment means are provided for attaching the bushing to the housing.

Each of the key holders comprises retaining means configured to pass through the retaining holes of keys. The retaining means, which retain the keys on the key holder, have a gap to allow the keys to be removed from and to be mounted on the retaining means.

The central housing includes a pair of opposed seats located at the ends of the housing. The seats have a pair of opposed, spaced abutment surfaces configured to contact the key holders and keeper means, connected to the abutment surfaces, for preventing the keys from being removed through the gaps of the retaining means when the key holders are in contact with the abutment surfaces. The central passageway communicates between the abutment surfaces. The central passageway includes, at one end, a shoulder having an inner facing surface and the primary bore which communicates between one of the abutment surfaces and the inner facing surface. The key holders are located at the ends of the housing and are operable for inward and outward movement between a retracted position, against the abutment surfaces and an extended position, spaced from the abutment surfaces. In the extended position, the gaps are exposed to permit keys to be mounted on and to be removed from the key holders.

The cartridge-like bushing is located within the other end of the passageway. The bushing includes a tubular sidewall and an endwall connected to the sidewall. The opening of the bushing is defined in the endwall. The biasing means bias the key holders in their retracted position. The connection means, which are configured to slidably extend through the primary bore and the opening in the endwall, connect the key holders to the biasing means for movement between their retracted and extended positions.

DESCRIPTION OF DRAWINGS

In the accompanying drawings:

FIG. 4 is a cross-sectional view of a key ring of the present invention taken along lines 4—4 of FIG. 3.

FIG. 5 is a fragmentary cross-sectional view of a key ring of the present invention taken along lines 5—5 of FIG. 4.

FIG. 6 is a fragmentary exploded rear perspective view of a key ring of the present invention illustrating the assembly of its operative components.

DETAILED DESCRIPTION

Figure 1:
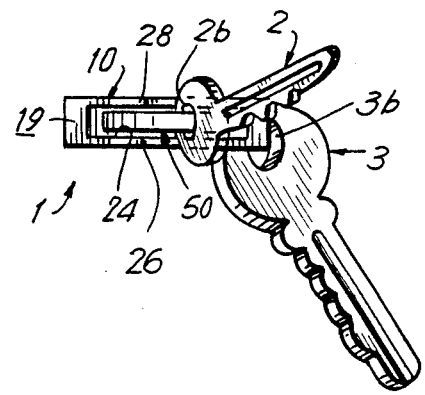
FIG. 1 is a top plan view of a double ended key ring of the present invention.
Figure 2:
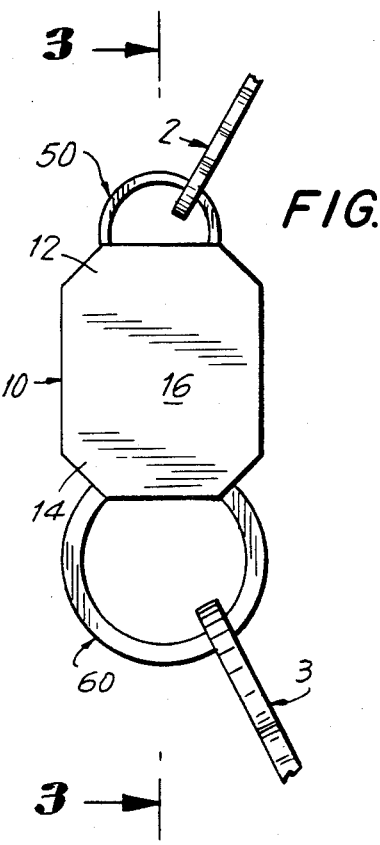
FIG. 2 is a front elevational view of the key ring illustrated in FIG. 1.
Figure 3:
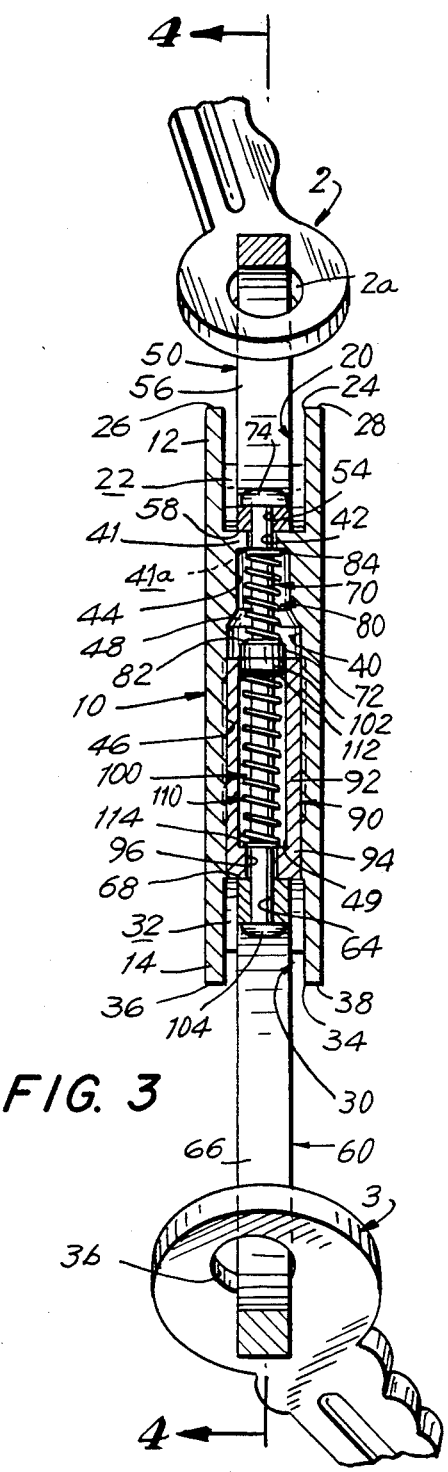
FIG. 3 is an enlarged cross-sectional view of a key ring of the present invention taken along lines 3—3 of FIG. 2.

The figures illustrate a double ended key ring 1 that is the preferred embodiment of the present invention. For exemplary purposes, the double ended key ring 1 is illustrated as retaining keys 2 and 3. With particular reference now to FIGS. 2, 3, and 4, the key ring 1 can be seen to include a central housing 10 having a pair of seats 20 and 30 located at its ends 12 and 14 and a pair of key holders 50 and 60 located within the seats 20 and 30. The key holders 50 and 60 have gaps 52 and 62 to permit a set of keys, such as keys 2 and 3, to be mounted on and to be removed from the key holders 50 and 60. As can best be seen in FIG. 4 the key holders 50 and 60 are operable for movement between a retracted position and an extended position. In the retracted position (illustrated by solid lines) the key holders 50 and 60 are located against the abutment surfaces 22 and 32 and are partially received within the seats 20 and 30. When the keyholders 50 and 60 are retracted, the seats 20 and 30 enclose the gaps 52 and 62 to act as keepers to prevent the removal of the keys 2 and 3 through the gaps 52 and 62. In the extended position (illustrated by phantom lines), the key holders 50 and 60 are manually displaced a distance from the abutment surfaces 22 and 32 to expose the gaps 52 and 62 and thus, allow keys to be mounted on and to be removed from the holders 50 and 60.

The key holder 50 is connected to the housing 10 and is biased against the abutment surface 24 by the preferred means of a first lock pin 70 and a first biasing spring 80 located within a central passageway 40 of the central housing 10. In order to facilitate the assembly of key ring by leaving the end 49 of the passageway open during the assembly, the present invention provides a cartridge-like bushing 90 that contains a second lock pin 100 extending through a second biasing spring 110. The second lock pin 100, the second biasing spring 110, the other key holder 60 and the bushing 90 are assembled as a subassembly. This subassembly is preferably then connected to the housing 10 by sizing the bushing 90 for a force fitting connection within the end 49 of the passageway 40.

Having briefly described the preferred embodiment of a double ended key ring of the present invention, a more detailed description begins with a description of the central housing 10. Central housing 10 preferably has a configuration in the form of an octagonal prism that has a pair of opposed octagonal, major surfaces 16 and 18 and a set of lateral surfaces 19 connecting the surfaces 16 and 18. The surfaces 16 and 18 can be advantageously utilized by being inscribed with advertising and the like.

The seats 20 and 30 of the housing are preferably a pair of inwardly directed grooves defining a pair of rectangular slot-like openings 24 and 34 located in the ends 12 and 14 of the housing 10. The arcuate abutment surfaces 22 and 32 form the bottom of the grooves.

The central passageway 40 communicates between the abutment surfaces 22 and 32. The central passageway includes, at one end, a shoulder 41 that has a inner facing surface 41a and primary bore 42 that communicates between the abutment surface 22 and the surface 41a. Bore 42 is sized to slidably receive the first lock pin 70. A contiguous secondary bore 44 extends from the primary bore 42 in the direction of the other end 49 of the central passageway 40. The secondary bore 44 has a diameter, that is larger than the primary bore 42 to define the shoulder 41 at the juncture of the bores. A tertiary bore 46, which has a greater diameter than the secondary bore 44, is spaced from and is coaxial to the secondary bore 44 and extends in the direction of the other end 49 of the central passageway 40. The secondary bore 44 and the tertiary bore 46 are connected by a frustroconical transitionary bore 48.

The enlarged tertiary bore 46 is necessary to accomodate the bushing 90. The diameter of the narrower secondary bore 44 is sized to center the spring 80 relative to lock pin 70. It is understood that an embodiment of the present invention could be formed with a single enlarged bore, extending from primary bore 42, having the same diameter as the tertiary bore 46. This embodiment would not be preferred in that such an enlarged bore would not center the spring 80 relative to the lock pin 70.

The key holders 50 and 60, as illustrated, preferably are substantially closed ring-like elements, each having the form of a circular annulus configured to pass through the retaining holes 2a and 3b of the keys 2 and 3. As mentioned previously, the key holders 50 and 60 respectively have gaps 52 and 62 for mounting the keys 2 and 3 on and for removing the keys 2 and 3 from the key holders 50 and 60. As can best be seen in FIGS. 3 and 4, when the key holder 50 is in its retracted position, it bears against abutment surface 22 and the gap 52 is located within and enclosed by the seat 20 to prevent the removal of the keys from key holder 50. The seat 30 and the key holder 60 are similarly configured to prevent keys from being removed from the key holder 60 when in its retracted positon. Additionally, when either of the key holders 50 and 60 are manually displaced, so as to be spaced from the respective abutment surfaces 22 and 32, and thus be in their extended positions (shown in phantom lines), either of the key holders 50 and 60 may be rotated through an angle of 90 degrees. Thereafter, tension on the key holders may be relaxed so that the key holders 50 and 60, respectively, rest on the lengthwise edges 26, 28, and 36, 38, defining the openings 24 and 34, to retain the key holders 50 and 60 in their extended positions.

With reference to FIGS. 3, 4, and 6, the key holder 50 is moveably connected to and is biased by the preferred means of the first lock pin 70 and the first biasing spring 80. The lock pin 70 has, at one end, an enlarged head 72 to bear against the end 82 of the spring 80 when inserted within the coils of the spring 80. The assembled lock pin and spring 70 and 80, are then extended through the end 49 of the central passageway until the other end 74 of the lock pin projects through the primary bore 42 and into the seat 20. At this point, the end 74 of the lock pin 70 is inserted into a hole 54 communicating between the inner and the outer peripheries 56 and 58 of the key holder 50. Pressure is then exerted on the pin 70, within the central passageway 40 and against the bias of the spring 80, until a portion of the end 74 of pin 70 projects into the inner periphery 56 of the key holder 50. At this point, the end 74 is peened to attach the lock pin 70 to the key holder 50.

Bushing 90 has a cylindrical sidewall 92 and an endwall 94 connected to the sidewall 92. The endwall 94 has an opening 96 that is sized to slideably receive the second lock pin 100. In a like manner to the assembly of the first lock pin 70 and the first biasing spring 80, the second lock pin 100 and the second biasing spring 110 are assembled within the end bushing 90, with the enlarged head 102 of the first lock pin 100 bearing against the end 112 of the second biasing spring 110. The other end 104 of pin 100 is then extended through the opening 96 and into a hole 64 communicating between the inner and outer peripheries 66 and 68 of the key holder 60. Pressure is then exerted on the pin 100 to an extent that a portion of the end 104 of the pin 100 projects into the inner periphery 66 of the key holder 60. At this point, the end 104 is peened to connect the pin 100 to the key holder 60.

The bushing is preferably configured, through appropriately sizing the sidewall 92, relative to the tertiary bore 46, and vice-versa, in a manner well known in the art, to engage within the tertiary bore 46 in a force fitting connection. Since, as previously mentioned, the key holder 60 may be rotated when in its extended position, the outer surface of the sidewall 92 is preferably provided with knurling 98, to resist rotation of the bushing 90 within the interior of tertiary bore 46. The knurling 98 can be best seen FIGS. 5 and 6.

As illustrated in FIGS. 3, 4, and 6, the diameter of key holder 50 is less than that of the key holder 60 to carry less keys. In accordance with the differential capacity of the key holders, the length of the first biasing spring 80 is less than that of the second biasing spring 110 to provide less of a biasing force to the key holder 50. Additionally, as per the spring sizing, the lock pins 70 and 100 are also differentially sized; and as such, the length of lock pin 70 is less than that of lock pin 100. Moreover, the combined lengths of the lock pins 70 and 100 are preferably greater than the total length of the passageway 40 such that the heads of the lock pins 70 and 100 are in contact when the key holders are in the retracted position. This design feature of the preferred embodiment, which can be incorporated into any embodiment of the present invention, allows the key ring 1 to be as compact as possible. It is understood that the key holders 50 and 60 could be of equal size and the biasing mechanisms provided by lock pins 70 and 100 and their associated biasing springs 80 and 110 could also be of any size ratio without departing from the scope of the invention.

It should be pointed out that although the key holders 50 and 60 are illustrated in the preferred embodiment as directly passing through the retaining holes of the keys, the keyholders of the present invention could be designed, in a manner well known in the art, to include detachable, completely closed ring-like elements to mount the keys. In such a possible embodiment, the ring-like elements would be releasably held by a pair of gapped elements that would in turn be biased to retract into a pair of seats located at the ends of the housing.

While specific embodiments of the invention have been shown and described, the invention should not however be considered as so limited, but only as so limited as set forth in the appended claims.

I claim:

1. A double ended key ring comprising;
a pair of opposed, spaced key holders, each of which comprises retaining means, configured to pass through the retaining holes of keys, for retaining the keys, said retaining means having a gap for removing the keys from and for mounting the keys on said retaining means;
a central housing including,
a pair of opposed seats, located at the ends of said housing, having a pair of opposed, spaced abutment surfaces configured to contact said key holders and keeper means, connected to said abutment surfaces, for preventing the keys from being removed through said gaps of said retaining means when said key holders are in contact with said abutment surfaces, and
a central passageway, communicating between said abutment surfaces, said passageway including, at one end, a shoulder having an inner facing surface, and a primary bore communicating between one of said abutment surfaces and said inner facing surface;
said key holders being located at the ends of said housing and being operable for independent outward and inward movement between a retracted position, against said abutment surfaces and an extended position, spaced from said abutment surfaces, in which said gaps are exposed to permit the keys to be mounted on and to be removed from said retaining means;
a cartridge-like bushing, located within the other end of said passageway, said bushing including a tubular sidewall and an endwall connected to said sidewall, said endwall having an opening;
bushing attachment means for attaching said bushing to said housing;
biasing means, locateed within said passageway, for biasing said key holders in their said retracted position; and
connection means, configured to slidably extend through said primary bore and said opening of said endwall, for connecting said key holders to said biasing means for movement between their said extended and retracted positions.

2. The double ended key ring of claim 1 wherein, said bushing attachment means comprises said sidewall sized, relative to said passageway, to engage within said passageway in a force fitting connection.

3. The double ended key ring of claim 2 wherein the outer surface of said sidewall is knurled to resist rotation of said bushing within said passageway.

4. The double ended key ring of claim 1 wherein:
said connection means include, a pair of first and second lock pins, respectively projecting, at one end, from said primary bore and said opening, each of said first and second lock pins having an enlarged head at its other end and key holder attachment means for attaching its said one projecting end to said key holders; and
said biasing means includes a pair of first and second biasing springs, respectively bearing, at one end, against said inner facing surface and said endwall with said first lock pin extending through the coils of said first biasing spring, said second lock pin extending through the coils of said second biasing spring, and the said heads of said first and second lock pins bearing against the other of the ends of said first and second biasing springs.

5. The double ended key ring of claim 4 wherein said central passageway further includes:
a contiguous secondary bore, extending from said primary bore, said secondary bore having a diameter greater than said primary bore to define said shoulder at the juncture of said bores and to center said first biasing spring relative to said first lock pin;
a tertiary bore, coaxially spaced from, and having a greater diameter than, said secondary bore, said tertiary bore defining said other end of said central passageway; and
a transitionary bore having a frustro-conical configuration, said transitionary bore, communicating between said secondary and said tertiary bores.

6. The double ended key ring of claim 4 wherein:
said housing has a pair of inwardly directed grooves defined at the ends of said housing to form said seats;
said abutment surfaces have an arcuate configuration and form the bottom of said grooves;
said grooves are configured to partially receive said key holders and enclose said gaps to form said keeper means; and
said retaining means, for each of said key holders, comprises a substantially closed circular, ring-like element, said element being sized to extend through the retaining holes of keys.

7. The double ended key ring of claim 6 wherein:
said one key holder has a smaller diameter than said other key holder;
said first biasing spring has a length that is less than the length of said second biasing spring to provide less of a biasing force to said one key holder; and
said first lock pin has a length that is less than that of said second lock pin.

8. The double ended key ring of claim 6 wherein the combined lengths of said first and second lock pins are greater than the length of said central passageway so that said heads of said first and second lock pins contact one another when said key holders are in their said retracted position.

9. The double ended key ring of claim 6 wherein said key holder attachment means comprises:
each of said elements, forming said retaining means, having a hole communicating between its inner and its outer peripheries; and
said one projecting ends of said first and second lock pins extending through said holes of said elements and being peened at the inner peripheries of said elements.

10. The double ended key ring of claim 6 wherein:
said housing has a configuration including a pair of opposed spaced, major surfaces and a set of lateral surfaces connecting said major surfaces;
said grooves define a pair of rectangular slot-like openings located in the ends of said housing; and
said key holders, when in their said extended position, are operable to be rotated, individually, through an angle of 90 degrees and thereafter rest upon the lengthwise edges of said slot-like openings.

* * * * *